United States Patent
Lu et al.

(10) Patent No.: US 10,664,556 B2
(45) Date of Patent: May 26, 2020

(54) ADAPTABLE USER INTERFACE LAYOUT

(71) Applicant: SAP SE, Walldorf (DE)

(72) Inventors: Ke Lu, Shanghai (CN); Yonggao Pan, Shanghai (CN); Jing Zhao, Shanghai (CN); Liangyi Zhang, Shanghai (CN); Jianzhong Li, Shanghai (CN); Wenqi Li, Shanghai (CN)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 15/690,783

(22) Filed: Aug. 30, 2017

(65) Prior Publication Data
US 2019/0065440 A1 Feb. 28, 2019

(51) Int. Cl.
| | |
|---|---|
| G06F 3/0481 | (2013.01) |
| G06F 17/21 | (2006.01) |
| G06F 17/24 | (2006.01) |
| G06F 9/451 | (2018.01) |
| G06F 8/38 | (2018.01) |
| G06F 9/445 | (2018.01) |

(52) U.S. Cl.
CPC .......... *G06F 17/212* (2013.01); *G06F 3/0481* (2013.01); *G06F 8/38* (2013.01); *G06F 9/44526* (2013.01); *G06F 9/451* (2018.02); *G06F 17/243* (2013.01)

(58) Field of Classification Search
CPC ...... G06F 3/0481; G06F 9/451; G06F 16/972; G06F 17/2247; G06F 16/284; G06F 9/44526; H04L 41/22
See application file for complete search history.

(56) References Cited

U.S. PATENT DOCUMENTS

| | | | |
|---|---|---|---|
| 7,418,456 B2 * | 8/2008 | Charlet | G06F 16/284 |
| 2009/0210482 A1 * | 8/2009 | Wynn | G06F 9/44526 |
| | | | 709/203 |
| 2011/0131512 A1 * | 6/2011 | Yan | G06F 9/451 |
| | | | 715/763 |
| 2014/0096014 A1 * | 4/2014 | Johnson | H04L 41/22 |
| | | | 715/733 |
| 2014/0229818 A1 * | 8/2014 | Goswami | G06F 17/2247 |
| | | | 715/234 |
| 2016/0034594 A1 * | 2/2016 | Baldwin | G06F 16/972 |
| | | | 715/234 |

* cited by examiner

*Primary Examiner* — Haoshian Shih
(74) *Attorney, Agent, or Firm* — Schwegman Lundberg & Woessner, P.A.

(57) ABSTRACT

Example embodiments for generating a user interface are presented. In an example embodiment, a layout definition for the interface is accessed, in which the layout definition defines user interface groups, each of which include one or more user interface elements. Also accessed are metadata describing the groups and the elements of each group, with each element having a corresponding type. One or more control renderers are also accessed, with each control renderer including programming code to render those of the elements of a corresponding type based on the metadata. Also accessed are one or more context renderers, with each context renderer including programming code to arrange the rendered elements in a layout for the user interface based on relationships between groups. The control renderers and context renderers are executed to render the user interface.

20 Claims, 6 Drawing Sheets

```
return {
  '/': {
    '^': ['lastModifiedDate', 'lastModifiedBy',
          '&ruleConfig/', 'wfConfiguration/code'],
    'header': ['label', 'id', 'description'],
    'basicProperties': ['effectiveDating', 'apiVisibility',
                        'status'],
    'advancedProperties': ['&FIELDS'],
    'bizkeys': ['businessKeyFields/#/'],
    'searchableFields': ['searchableFields/#/'],
    'security': ['&rbpConfig/']
  }
};
```

FIG. 4

FIELDS — FOR ADJUSTMENT OF FIELDS WITHIN YOUR FORM.    SHOW ALL FIELDS [ NO ⚪ ]

| LABEL | NAME | DATA TYPE | VISIBILITY | REQUIRED |
|---|---|---|---|---|
| [ ] | [ ] | STRING ▾ | EDIT. ▾ | YES ⚪ |
| 522 | 524 | 526 | 528 | 529 |

520

ADVANCED OPTIONS — 532

| DATABASE FIELD NAME | HELP TEXT | DEFAULT VALUE |
|---|---|---|
| [ ] | [ ] | [ ] |
| 534 | 536 | 538 |

CASCADE
[ NONE ▾ ]
539

530

[ + ADD FIELD ]
516

BUSINESS KEYS — 542

[ + ADD ROW ]
546

540

SEARCHABLE FIELDS — 552

[ + ADD ROW ]
556

ADAPTABLE USER INTERFACE LAYOUT

FIELD

The present application relates generally to data processing and, more specifically in an example embodiment, to a user interface layout that is automatically adaptable, such as to changes in data schema.

BACKGROUND

User interface (UI) design is strongly influenced by the types and amounts of data to be presented to, or entered by, a user via the UI being designed. For example, certain types of output data, such as percentages relating to relatable categories of data (e.g., data associated with different geographic areas over a particular time period), may be presented in a pie chart, while data covering different time periods (e.g., data associated with different months or years) may be depicted in a bar graph. The same is often true regarding input data, as a predetermined list of items from which a user is to select a particular item may be presented by way of a dropdown menu, while user textual input, such as a user-specified file name, may be facilitated by way of an input text box.

Typically, the types of data to be presented to, or entered by, a user also affects the UI "layout," or arrangement of the individual UI items or "elements" representing that data. Generally, a UI developer is tasked with hardcoding the layout based on the particular elements to be presented in the UI. Consequently, the UI developer updates the UI layout when one or more aspects of that data are changed.

BRIEF DESCRIPTION OF DRAWINGS

The present disclosure is illustrated by way of example and not limitation in the figures of the accompanying drawings, in which like reference numbers indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
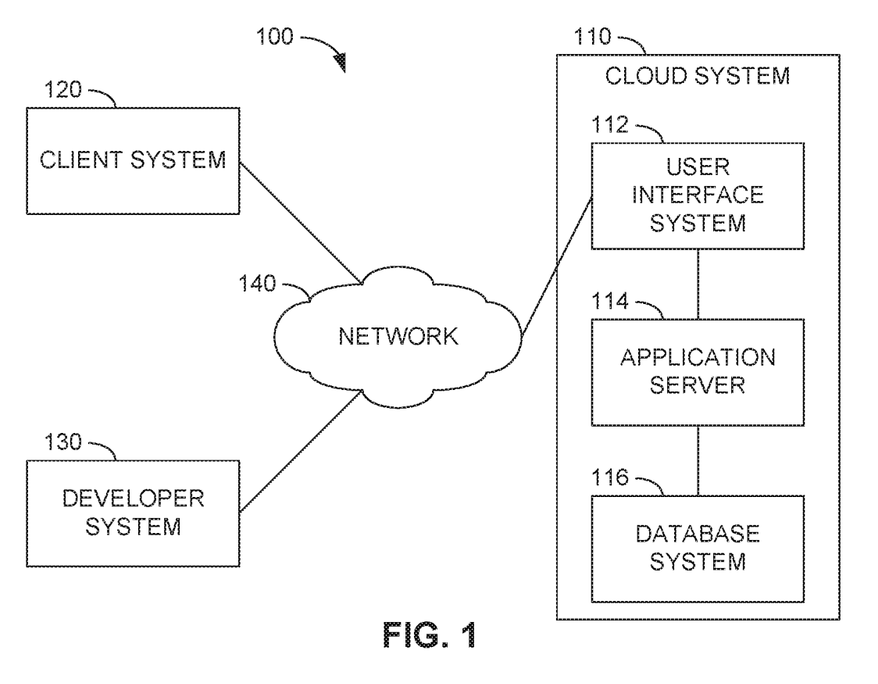
FIG. 1 is a block diagram of an example cloud-based system.

FIG. 1 is a block diagram of an example cloud-based system 100 that may include a cloud system 110 to which a client system 120 and a developer system 130 may be communicatively coupled by way of a communication network 140. In example embodiments, each of the client system 120 and the developer system 130 may be a desktop computer, laptop computer, tablet computer, smart phone, or other computing or communication device. The communication network 140 may be a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof.

In an example embodiment, the cloud system 110 is configured to provide the client system 120 access to one or more applications executable on an application server 114 over the communication network 140. Additionally, the application server 114 may access a database system 116 that includes one or more databases containing data used by the application server 114 to perform one or more tasks.

In example embodiments, the client system 120 may access the application server 114 by way of a frontend user interface system 112. In the example embodiments described below, the user interface system 112 provides a web-based graphical user interface (GUI) for an application executing on the application server 114 that is accessible via a web browser executing on the client system 120. However, in other example embodiments, the user interface system 112 may provide an application programming interface (API) by which a dedicated client application executing on the client system 120 may interact with the application executing on the application server 114. The user interface system 112 may provide other types of interfaces for the client system 120 to interact with an application executing on the application server 114 in other example embodiments.

The developer system 130, in an example embodiment, may be configured to customize or otherwise alter the user interface presented to the client system 120 for interacting with an application executing on the application server 114. Example embodiments of such customization are discussed below in relation to FIG. 2 through FIG. 5.

Figure 2:
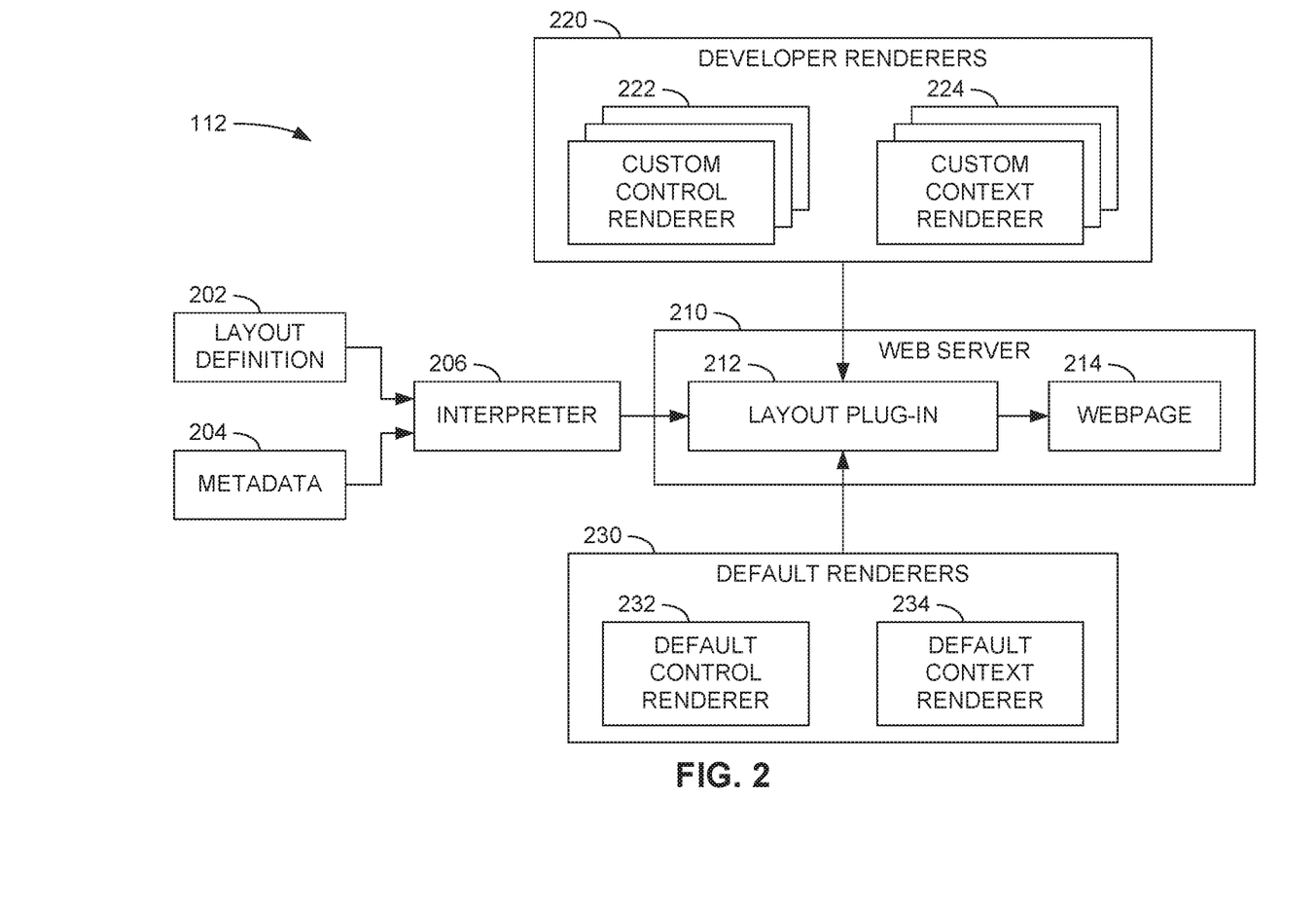
FIG. 2 is a block diagram of an example user interface system of the example cloud system of FIG. 1.

FIG. 2 is a block diagram of an example embodiment of the user interface system 112 of the cloud system 110 of FIG. 1. In this example embodiment, the user interface system 112 may include a web server 210 that includes a user interface layout plug-in 212. In example embodiments, a plug-in is programming code that provides additional functionality in the web server 210 by way of an API provided by the web server 210. However, other methods or systems by which the functionality of the plug-in, as described in greater detail below, may be provided other than via a plug-in may be employed in other example embodiments.

In various example embodiments described hereinafter, the layout plug-in 212 facilitates a user interface layout mechanism that may adapt automatically, or with minimal assistance via a developer or other individual, to changes in data schema and other aspects of the input and/or output data associated with an application. In example embodiments, a user interface layout is the identification and visual arrangement of individual user interface elements, and or groups of individual user interface elements, displayed in a GUI.

As depicted in FIG. 2, an interpreter 206 accesses or receives a layout definition 202 and metadata 204 regarding a user interface (e.g., a webpage 214 to be presented to a user of the client system 120). In an example embodiment, the layout definition 202 includes information defining one or more UI groups, and possibly defining one or more UI elements for each UI group of one or more of the UI groups.

Examples of the UI elements include, but are not limited to, labels, text areas, tables, text boxes, input buttons (e.g., radio buttons), dropdown menus, and images (e.g., icons). In some example embodiments, one or more of the UI groups and/or UI elements may be referenced indirectly in the layout definition 202 by way of one or more "placeholders" that do not explicitly list each of the UI groups and/or UI elements to be presented in the user interface layout.

In an example embodiment, the layout definition 202 may be stated in a human-readable data interchange format, such as JavaScript Object Notation (JSON) or Extensible Markup Language (XML). An example layout definition 202 is discussed below in conjunction with FIG. 4.

The metadata 204 received by the interpreter 206 may include data identifying one or more of the UI elements to be arranged in the layout of the user interface, as indicated in the layout definition 202. The metadata 204 may also include attributes of each UI element referenced in the metadata 204, such as a type of data associated with the UI element (e.g., a number, a character string, a date, and so on), any text to be displayed as part of the UI element, whether the filling of the data for the UI element by a user is mandatory or optional, and so on. In some example embodiments, at least some of the UI elements may represent fields of a form (e.g., a web form) to be filled by a user.

In some example embodiments, the metadata 204 may include information that describes one or more of the UI groups that are to be presented in the layout of the user interface. Such information may include, but is not limited to, which and how many UI elements are to be displayed in a UI group, how those UI elements may be organized or displayed (e.g., in a table), and so on. Other information regarding one or more UI elements and/or UI groups may be provided in the metadata 204 in other example embodiments.

The metadata 204, in some example embodiments, may be provided from the data schema of a database, such as the database system 116. Moreover, the metadata 204 may supplement the data schema with additional information not provided via the data schema. For example, help text for the user interface indicating the type or format of information to be entered by a user in a text box, may supplement a UI element including the text box. Such information may be provided in a help text file or other file including a portion of the metadata 204.

The interpreter 206, in an example embodiment, is configured to receive and process the layout definition 202 and the metadata 204 to correlate the various UI groups and UI elements for rendering the resulting user interface. For example, the interpreter 206 may identify the UI groups identified in the layout definition 202. As discussed below, the layout definition 202 may include one or more placeholders for such information, thus indicating that the information represented by the placeholders are to be included in the user interface. Such a process may be considered as extracting the UI groups to be included in the user interface.

The interpreter 206 may also identify each of the UI elements to be included in each of the extracted user interface groups using the information in the metadata 204. As with some of the UI groups, one or more of the UI elements may be identified indirectly via the use of the example layout definition of FIG. 4, discussed below.

As a result of the extraction of the UI groups and their interrelationships, and the identification of the various UI elements and their attributes, the interpreter 206 may provide one or more data structures identifying the UI groups, as well as all UI elements and their attributes, to be displayed in the user interface. While FIG. 2 depicts the interpreter 206 as a module or component distinct from the layout plug-in 212, the interpreter 206 may be integrated with the layout plug-in 202 in other example embodiments.

The layout plug-in 212, in example embodiments, is configured to employ the information regarding the extracted UI groups and associated UI elements as input to one or more renderers 220, 230. In example embodiments, each renderer 220, 230 is a segment of programming code (e.g., a procedure, method, or the like) that renders at least one portion or aspect of the user interface based on a corresponding portion of the information provided by the interpreter 206. In the particular example embodiment of FIG. 2, two types of renderers 220, 230 are provided: control renderers 222, 232 and context renderers 224, 234. Moreover, in some example embodiments, control renderers 222, 232 may be classified as custom control renderers 222 and default control renderers 232, while the context renderers 224, 234 may be further subdivided into custom context renderers 224 and default context renderers 234. Also in some example embodiments, software developers or other personnel may create or provide the custom control renderers 222 and the custom context renderers 224 for particular users, such as users associated with a particular customer of the cloud system 110, while software developers associated with the provider of the cloud system 110 may create the default control renderer 232 and the default context renderer 234. While FIG. 2 depicts a single default control renderer 232 and a single default context renderer 234, multiple such default renderers 232, 234 may be provided in other example embodiments. Additionally, the layout plug-in 212 may be configured to use the default control renderer 232 and/or the default context renderer 234 only if an applicable custom control renderer 222 and/or custom context renderer 224 are not available. The layout plug-in 212, in example embodiments, may call or otherwise invoke each applicable control renderer 222, 232 and context renderer 224, 234 one or more times to render completely the user interface (e.g., the webpage 214) for presentation to the user.

In example embodiments, each control renderer 222, 232 may be configured to render those of the UI elements to be presented in the user interface that are of a particular UI element type (e.g., text input box, radio button, dropdown menu, and so on). In an example embodiment, the layout plug-in 212 may provide input describing a particular UI element to be rendered (e.g., data type, data value, label, help text, and so on, as provided by the interpreter 206) to the control renderer 222, 232 for that particular UI element type. In response, the layout plug-in 212 may receive a rendering of that particular UI element to be presented along with the other rendered UI elements of the user interface. In rendering that UI element, the control renderer 222, 232 may determine the particular color, shading, size, and other aspects of the rendering of that UI element.

Each context renderer 224, 234, in example embodiments, may be configured to arrange the layout of a particular "context" of UI groups, of the user interface. For example, a particular context renderer 224, 234 may be configured to define or determine various aspects of UI groups, such as one or more relationships (e.g., hierarchical relationships) between two or more of the UI groups referenced in the layout definition 202. For example, a context renderer 224, 234 may indicate that one UI group is nested inside another UI group, or that one UI group is parallel to (e.g., on the same hierarchical level as) another UI group. Other relationships between various UI groups may also be specified in other example embodiments. The context renderer 224, 234 may also determine other information (e.g., the data source for one or more UI elements of the UI groups) based on a particular higher-level UI group in which the other UI groups are nested. The layout plug-in 212, in example embodiments, may identify one or more applicable context renderers 224, 234 based on the UI groups extracted by the interpreter 206. The layout plug-in 212 may call or otherwise invoke each of the identified one or more context renderers 224, 234, providing a particular UI group as input, with the called context renderer 224, 234 producing a portion of the layout involving that UI group.

Moreover, the layout plug-in 212 may render the overall user interface (e.g., the webpage 214) based on the outputs or results produced by the control renderers 222, 232 and the context renderers 224, 234. In an example embodiment, the layout plug-in 212 takes the rendered UI elements and the arranged UI groups and produces a final rendering of the user interface based on an overall layout defined in the layout definition 202. The rendered user interface may then be provided to a user (e.g., communicated to the client system 120 via the network 140 for display to the user) to facilitate interaction of the user with the corresponding application executing on the application server 114.

In FIG. 2, other modules or components may be included in the user interface system 112, but are not explicitly depicted in FIG. 2 to simplify and focus the foregoing discussion. Also, in some example embodiments, the user interface system 112 may include greater or fewer numbers of modules, some modules may be combined, and/or some modules may be divided into greater numbers of modules.

Figure 3:
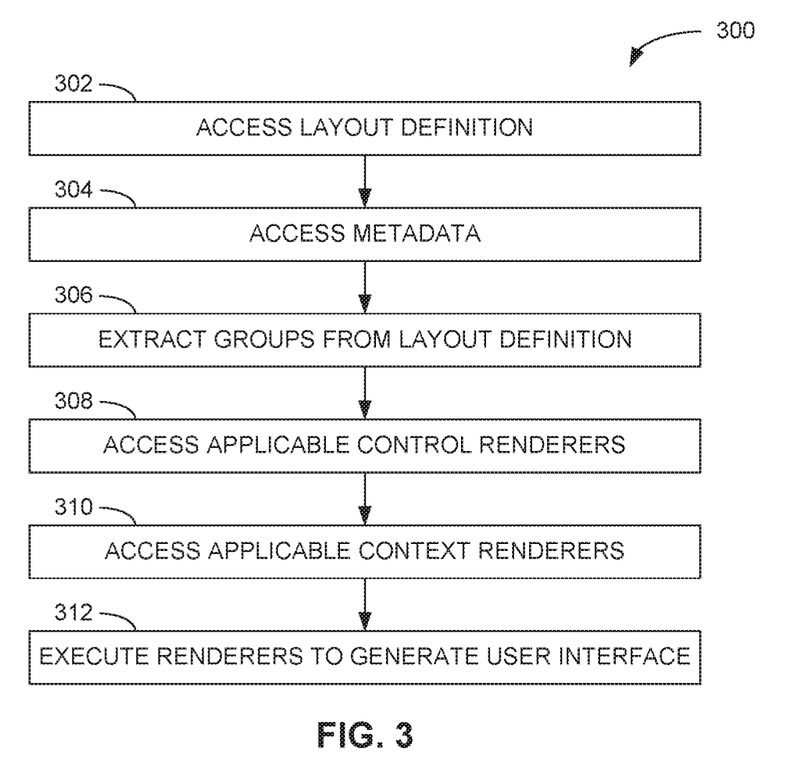
FIG. 3 is a flow diagram of an example method of employing an adaptable layout for a user interface.

FIG. 3 is a flow diagram of an example method 300 of employing an adaptable layout for a user interface. While the method 300, as well as other methods described herein, is presented as being performed by the user interface system 112 of FIG. 2, systems or devices other than the user interface system 112 may perform these methods in other example embodiments.

In the method 300, the user interface system 112 (e.g., via the interpreter 206) may access the layout definition 202 (operation 302) and the metadata 204 (operation 304). In an example embodiment, the interpreter 206 may access a particular layout definition 202 and associated metadata 204 based on the identity of the particular user interface (e.g., a particular webpage 214) to be displayed to the user at that time, as specified by the particular application being executed. Based on the layout definition 202 and the metadata 204, the UI groups to be presented in the user interface are extracted (e.g., via the interpreter 206) (operation 306). The extracted UI groups, as well as the UI interface elements included therein, may then be employed (e.g., by the layout plug-in 212) to access the control renderers 222 (operation 308) and context renderers 224 (operation 310) applicable to those UI groups and UI elements. The user interface system 112 (e.g., via the layout plug-in 212) may execute the accessed control renderers 222 and context renderers 224 to render the user interface (operation 312).

In the method 300 of FIG. 3, while a particular order of execution is shown for the operations 302-312, other orders of execution are also possible, including possible simultaneous, concurrent, or overlapping execution of two or more of the operations 302-312.

Figure 4:
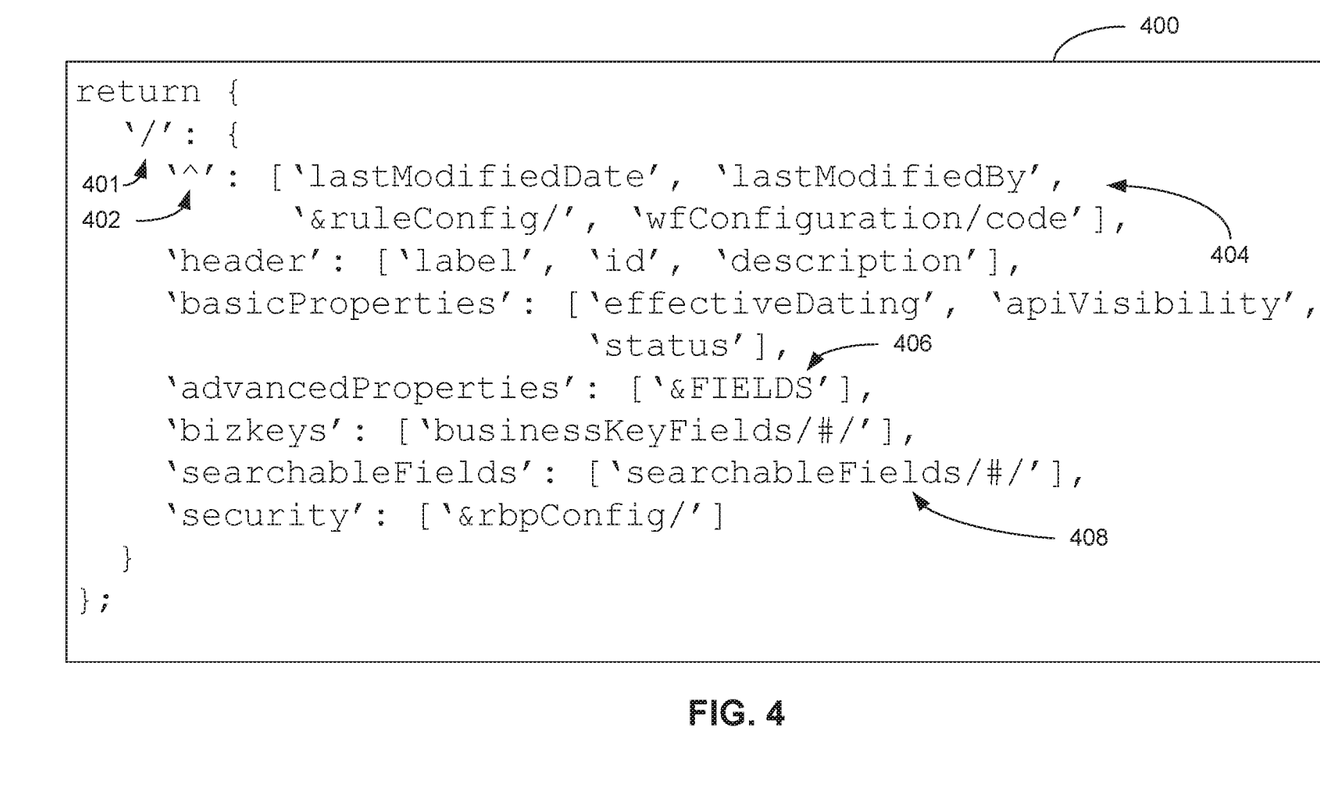
FIG. 4 is a graphical representation of an example user interface layout definition usable in the user interface system of FIG. 2.

FIG. 4 is a graphical representation of a layout definition 400 (serving as an example of the layout definition 202 of FIG. 2) usable in the user interface system 112. In an example embodiment, the layout definition 400 is returned to a caller of a method configured to provide the layout definition 400. As shown in FIG. 4, the layout definition 400 includes a root notation 401 (e.g., the '/' text character), indicating that the layout definition 400 defines at least a top-level UI group for a layout of a user interface. In some example embodiments, lower-level UI groups of a group hierarchy may be defined in the layout definition 400 or other layout definitions not shown in FIG. 4.

After the root notation 401, the layout definition 400 presents a list of UI groups, in which each UI group is identified by way of a reference string followed by one or more other reference strings enclosed in brackets, in which the other reference strings identify UI elements (and, in some embodiments, other UI groups) nested within the referenced UI group. For example, a UI group 402 labeled '^' includes a list 404 of four UI elements: a 'lastModifiedDate' element, a 'lastModifiedBy' element, a '&ruleConfig' element, and a 'wfConfiguration/code' element. In this example embodiment, the '^' label indicates that the corresponding UI group remains hidden from the user (e.g., is not displayed in the user interface). Such a UI group may be useful in providing various metadata (e.g., the identity of the developer who provided the layout definition 400, the date of the most recent modification of the layout definition 400, and so on) of potential interest to developers. In addition, the reference strings identifying the UI elements may refer to various elements of the data schema of a database, or may refer to other data items, from which the metadata 204 associated with the layout definition 400 may be obtained. In an example embodiment, an ampersand (&) starting a reference string (e.g., '&ruleConfig' and '&rbpConfig') indicates that the value referred to by the reference string holds an address for an actual UI element or group.

After the hidden UI group, the layout definition, several UI groups are listed and identified by corresponding character strings (e.g., 'header,' 'basicProperties,' 'advancedProperties,' and so on), each followed by a list of UI groups or elements that are also identified by various character strings. In an example embodiment, the order in which the UI groups are listed determines the order of appearance in the layout for the user interface. Moreover, in some example embodiments, a listing order of UI elements within a particular UI group may determine an order of appearance of those UI elements within the UI group.

In the particular example of the 'advancedProperties' group, an '&FIELDS' character string 406 is used to reference an address at which a list of multiple fields as UI elements for the 'advancedProperties' group may be found. The use of the '&FIELDS' string 406 represents the use of a placeholder for UI element information that is provided elsewhere, such as in a data schema for a database. Consequently, changes in the data schema that effect the UI elements referenced by '&FIELDS' string 406 are automatically taken account in the user interface without corresponding changes being made to the layout definition 400.

Also illustrated in FIG. 4, the 'bizkeys' UI group, by way of its reference to 'businessKeyFields/#/,' and the 'searchableFields' UI group, via its reference to 'searchableFields/#/' 408, employ the '#' character as a different type of placeholder indicating that multiple UI elements referenced by those character strings are to be presented in a particular format, such as, for example, numbered and placed in a table for presentation to the user. Accordingly, changes in the 'businessKeyFields' and the 'searchableFields' (as specified in a data schema, for example) are represented in the resulting user interface automatically without corresponding alterations to the layout definition 400. Other types of placeholders may be used in the layout definition 400 in other example embodiments.

Figure 5:
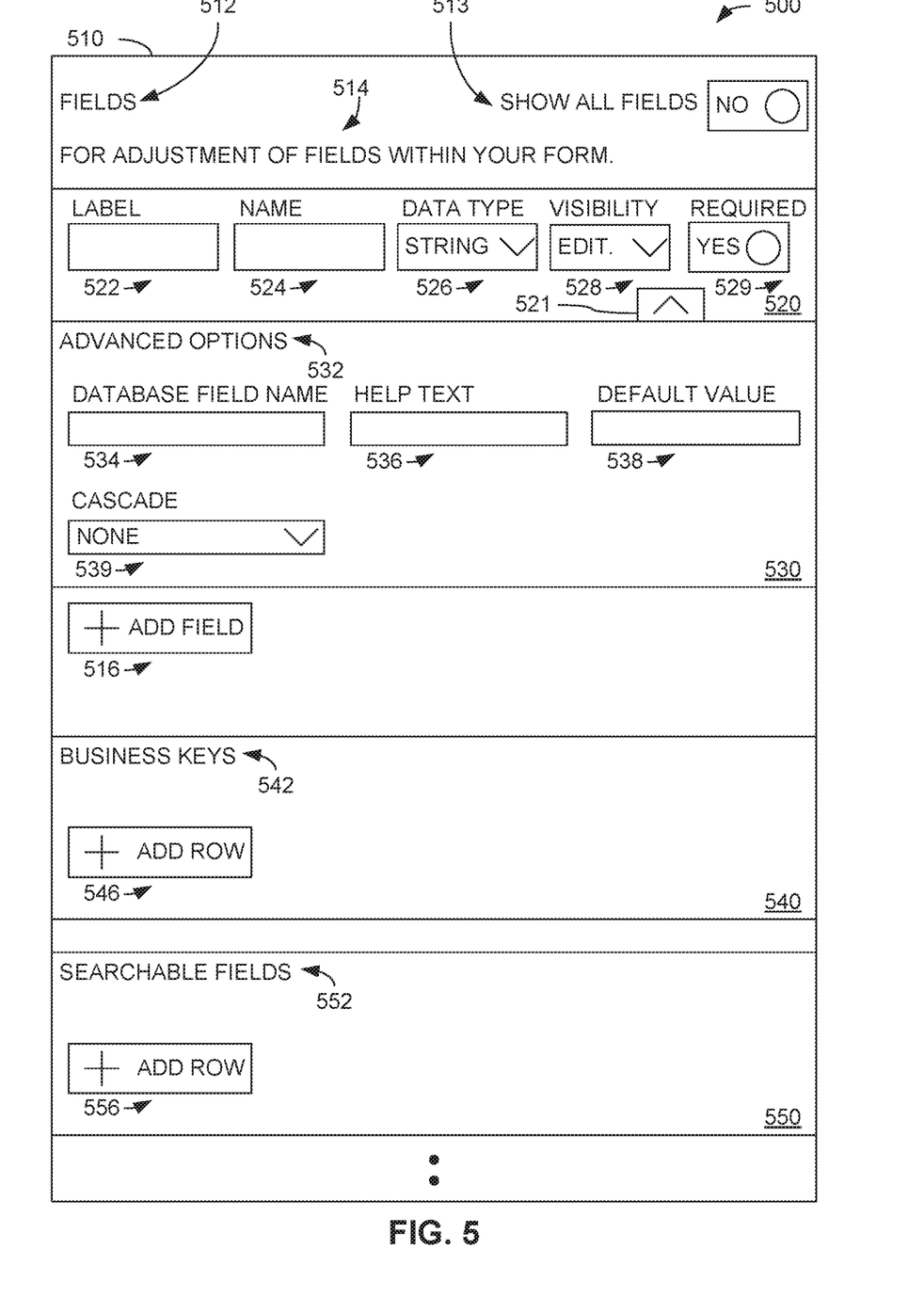
FIG. 5 is a graphical representation of an example user interface resulting from the user interface layout definition of FIG. 4.

FIG. 5 is a graphical representation of an example user interface 500 resulting from the layout definition 400. In this particular example, the user interface 500 is an interface presented to a user, such as an employee of a corporation, tasked with generating a form for corporate use. The user interface (e.g., webpage 214) explicitly displays five user interface groups 510, 520, 530, 540, 550 that correspond to the 'header,' 'basicProperties,' 'advancedProperties,' 'bizkeys,' and 'searchableFields' UI groups, respectively. The hidden '^' group is not displayed, as discussed above. As indicated above, the UI groups 510, 520, 530, 540, 550 are presented in the order of appearance indicated in the layout definition 400.

The 'header' group 512, in an example embodiment, includes a label UI element 512 ("Fields"), an identifier UI element 513 with an associated radio button, and a description UI element 514 describing the user interface. Each of the UI elements 512, 513, and 514 correspond to the UI element reference strings 'label,' 'id,' and 'description' of the layout definition 400. In an example embodiment, the radio button, when not selected, facilitates the presentation of UI elements associated with all fields of the form to be displayed via the user interface 500 for viewing and configuring by the user.

The 'basicProperties' group 520 is configured to provide basic information for a corresponding form field, including UI elements for a field label 522, a field name 524, a field data type 526 (e.g., character string, integer, etc.), a field visibility 528 (e.g., invisible, visible, editable, etc.), and a "required" radio button 529. The field label 522 and the field name 524 each have a text box for user input along with a label for that text box. Such information may be specified via the control renderer 222, 232 for those UI elements. Similarly, the field data type 526 and the field visibility 528 each have a dropdown menu and a label for that menu, which may also be specified via the control renderer 222, 232 for those UI elements. The "required" radio button 529 has a label ("Required") associated with the radio button 529, which may by specified via the control renderer 222, 232 corresponding to the radio button 529.

In an example embodiment, one of more of the UI elements explicitly listed in the layout definition 400 correspond to one or more of the UI elements, such as the 'apiVisibility' UI element corresponding to the field visibility 528 element. Other UI elements 522, 524, 526, 529, or aspects thereof, of the 'basicProperties' group 520 may be specified by the metadata 204 and/or the control renderers 222, 232 associated with those UI elements 522, 524, 526, 529.

Also included in the 'basicProperties' group 520 is an expansion button 521 that, when activated or deactivated by the user, causes the display or hiding, respectively, of the 'advancedProperties' group 530 associated with the same form field as the 'basicProperties' group 520. As shown in FIG. 5, the expansion button 521 is activated, thus causing the 'advancedProperties' group 530 associated with 'basicProperties' group 520 to be displayed. If, instead, the expansion button 521 is deactivated (e.g., resulting in the included arrow pointing downward), the 'advancedProperties' group 530 would be hidden from view.

As shown in FIG. 5, the 'advancedProperties' group 530 includes a group label ("Advanced Options") 532, a database field name UI element 534, a help text UI element 536, a default value UI element 538, and a cascade UI element 539. The database field name UI element 534, the help text UI element 536, and the default value UI element 538 each include a text box and associated label, while the cascade UI element 539 includes a dropdown menu and associated label. One or more of these elements 532, 534, 536, 538, 539 may be identified via the '&FIELDS' 406 placeholder of the 'advancedProperties' group 530 identified in the layout definition 400, mentioned above. Consequently, changes to a data schema defining the UI elements 532, 534, 536, 538, 539 of a particular form field may be automatically represented in the user interface 500 by way of that placeholder. Moreover, one or more aspects of the elements 532, 534, 536, 538, 539 may be specified via the metadata 204 associated with the 'advancedProperties' group 530 and/or the control renderers 222, 232 associated with the elements 532, 534, 536, 538, 539. In addition, a context renderer 224, 234 associated with the 'advancedProperties' group 530 may determine the particular UI elements 532, 534, 536, 538, 539 to be presented, and/or aspects thereof, based on the context of the 'advancedProperties' group 530 (e.g., the particular form field associated with the 'advancedProperties' group 530).

In an example embodiment, one or more context renderers 224, 234 may include information indicating that the 'basicProperties' group 520 and the 'advancedProperties' group 530 for a particular form field are parallel UI groups within a higher-level UI group associated with that form field.

Also in an example embodiment, an "add field" button 516 may be presented in the user interface 500. In an example embodiment, the "add field" button 516, when activated by the user (e.g., via a mouse click), facilitates the presentation of an additional 'basicProperties' group 520, and possibly an associated 'advancedProperties' group 530 (based on the state of the expansion button 521 of the added 'basicProperties' group 520). The "add field" button 516, in an example embodiment, may be described by way of the metadata 204 associated with the layout definition 400, or by way of the context renderer 224, 234 associated with the 'header' group 512. Additionally, one or more context renderers 224, 234 may include information indicating that the "add field" button 516 is included in a higher-level UI group parallel to each UI group associated with each form field, and the activation of the "add field" button 516 may cause the addition of another 'basicProperties' group 520 and associated 'advancedProperties' group 530 for the newly added form field.

Displayed after the UI groups 520, 530 associated with each field of the form being generated are a 'bizkeys' UI group 540 and a 'searchableFields' UI group 550, presented in the order specified in the layout definition 400. (The 'security' UI group of the layout definition 400 is not explicitly presented in the user interface 500 due to space constraints of FIG. 5.) As indicated, the 'bizkeys' UI group 540 includes a label UI element 542 ("Business Keys") and an "add row" button 546, while the 'searchableFields' UI group 550 includes a label UI element 552 ("Searchable Fields") and an "add row" button 556. As shown in FIG. 5, neither the 'bizkeys' UI group 540 nor the 'searchableFields' UI group 550 have any specified business keys or form fields at this point. However, activation of an "add row" button 546, 556 may result in the addition of one or more UI groups and/or UI elements within the corresponding 'bizkeys' UI group 540 or 'searchableFields' UI group 550. Additionally, each added row may be referenced in the layout definition 400 by way of the 'businessKeyFields/#/' or the 'searchableFields/#/' 408 placeholders discussed above. Further, in an example embodiment, the identity of the various UI group and/or UI elements for each row may be specified via a context renderer 224, 234 associated with the 'bizkeys' UI group 540 or the 'searchableFields' UI group 550.

In an example embodiment, a user interface system comprises one or more hardware processors and a memory storing instructions that, when executed by at least one of the one or more hardware processors, cause the user interface system to perform operations comprising accessing a layout definition for a user interface, the layout definition defining one or more user interface groups, each of the one or more user interface groups comprising one or more user interface elements; accessing metadata describing the one or more user interface groups and the one or more user interface elements of each of the one or more user interface groups, each of the one or more user interface elements having an element type; accessing one or more control renderers, each control renderer comprising first programming code configured to render those of the one or more user interface elements of a corresponding element type based on the metadata describing those of the one or more user interface elements of the corresponding element type; accessing one or more context renderers, each context renderer comprising second programming code configured to arrange one or more of the rendered user interface elements in a layout for the user interface based on one or more relationships between the one or more user interface groups; and executing the one or more control renderers and the one or more context renderers to render the user interface.

In an example embodiment, a method for generating a user interface comprises accessing, at a data store by a computer system, a layout definition for a user interface, the layout definition defining one or more user interface groups, each of the one or more user interface groups comprising one or more user interface elements; accessing, at the data store by the computer system, metadata describing the one or more user interface groups and the one or more user interface elements of each of the one or more user interface groups, each of the one or more user interface elements having an element type; accessing, at the data store by the computer system, one or more control renderers, each control renderer comprising first programming code configured to render those of the one or more user interface elements of a corresponding element type based on the metadata describing those of the one or more user interface elements of the corresponding element type; accessing, at the data store by the computer system, one or more context renderers, each context renderer comprising second programming code configured to arrange one or more of the rendered user interface elements in a layout for the user interface based on one or more relationships between the one or more user interface groups; and executing, by the computer system, the one or more control renderers and the one or more context renderers to render the user interface.

In another example embodiment, including all previous example embodiments, the layout definition comprises a reference string for each of the one or more user interface elements of each of the user interface groups; and a listing order of the reference strings for the one or more user interface elements of a corresponding user interface group determines a display order of the one or more user interface elements in the user interface for the corresponding user interface group.

In another example embodiment, including all previous example embodiments, a listing order of the one or more user interface groups determines a display order of the one or more user interface groups in the user interface.

In another example embodiment, including all previous example embodiments, the metadata for a first user interface element comprises a type of data to be presented in the first user interface element.

In another example embodiment, including all previous example embodiments, the metadata for a first user interface element comprises text to be displayed for the first user interface element.

In another example embodiment, including all previous example embodiments, the metadata for a first user interface group comprises a visual format in which the one or more user interface elements of the first user interface group are to be displayed.

In another example embodiment, including all previous example embodiments, the metadata for a first user interface group comprises an indication of a number of user interface elements of the first user interface group that are to be displayed.

In another example embodiment, including all previous example embodiments, the one or more relationships between the one or more user interface groups comprises a first user interface group being nested within a second user interface group.

In another example embodiment, including all previous example embodiments, the one or more relationships between the one or more user interface groups comprises a first user interface group being parallel to a second user interface group.

In another example embodiment, including all previous example embodiments, the method further comprises extracting the one or more user interface groups based on the layout definition; and identifying the one or more user interface elements of each of the extracted one or more user interface groups.

In another example embodiment, including all previous example embodiments, the layout definition comprises an identity of a first user interface group of the one or more user interface groups and a placeholder identifier representing one or more user interface elements of the first user interface group; and the identifying of the one or more user interface elements comprises identifying the one or more user interface elements of the first user interface group based on the placeholder identifier.

In another example embodiment, including all previous example embodiments, the method further comprises identifying the one or more context renderers based on the extracted one or more user interface groups; and identifying the one or more control renderers based on the identified one or more user interface elements of each of the extracted one or more user interface groups.

In another example embodiment, including all previous example embodiments, the identifying of the one or more context renderers comprises determining that a first user interface group of the one or more user interface groups is not explicitly represented in a context renderer; and identifying a default context renderer as one of the one or more context renderers based on the determining that the first user interface group of the one or more user interface groups is not explicitly represented in a context renderer.

In another example embodiment, including all previous example embodiments, the identifying of the one or more control renderers comprises determining that a first element type corresponding to at least one of the one or more user interface elements is not explicitly represented in a control renderer; and identifying a default control renderer as one of the one or more control renderers based on the determining that the first element type corresponding to at least one of the one or more user interface elements is not explicitly represented in a control renderer.

In another example embodiment, including all previous example embodiments, at least a portion of the metadata comprises at least a portion of a database schema.

In another example embodiment, including all previous example embodiments, the accessing of the layout definition, the metadata, the one or more control renderers, and the one or more context renderers is performed by a plug-in module for a web server; and the executing of the one or more control renderers and the one or more context renderers is initiated by the plug-in.

In another example embodiment, including all previous example embodiments, the layout definition is represented in a human-readable data interchange format.

In another example embodiment, including all previous example embodiments, the user interface comprises a webpage.

In an example embodiment, a non-transitory computer-readable storage medium stores instructions that, when executed by one or more processors of a machine, cause the machine to perform operations comprising accessing a layout definition for a user interface, the layout definition defining one or more user interface groups, each of the one or more user interface groups comprising one or more user interface elements; accessing metadata describing the one or more user interface groups and the one or more user interface elements of each of the one or more user interface groups, each of the one or more user interface elements having an element type; accessing one or more control renderers, each control renderer comprising first programming code configured to render those of the one or more user interface elements of a corresponding element type based on the metadata describing those of the one or more user interface elements of the corresponding element type; accessing one or more context renderers, each context renderer comprising second programming code configured to arrange one or more of the rendered user interface elements in a layout for the user interface based on one or more relationships between the one or more user interface groups; and executing the one or more control renderers and the one or more context renderers to render the user interface.

Figure 6:
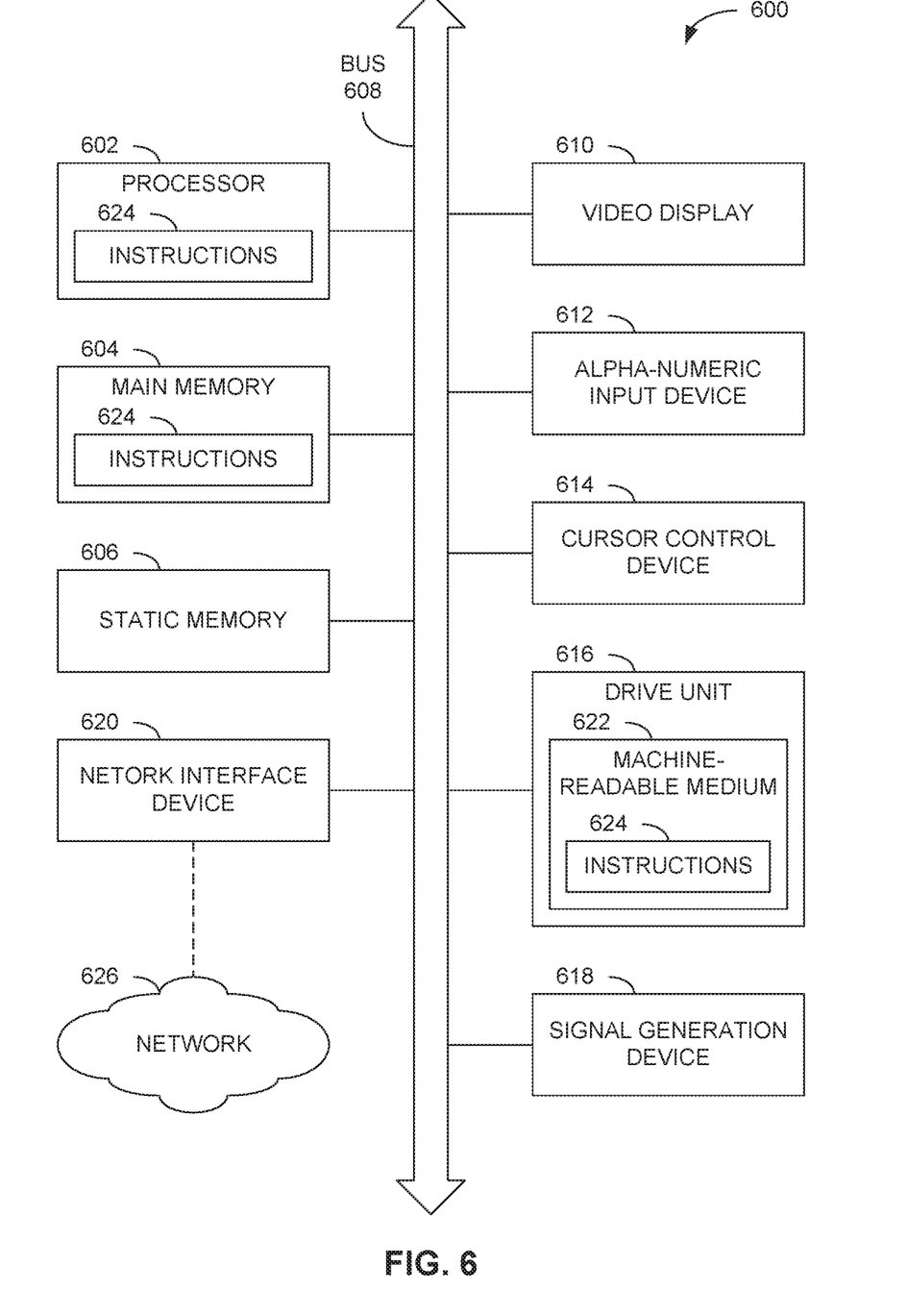
FIG. 6 is a block diagram of a computer processing system within which a set of instructions may be executed for causing a computer to perform any one or more of the methodologies discussed herein.

FIG. 6 is a block diagram of a computer processing system 600 within which a set of instructions 624 may be executed for causing a computer to perform any one or more of the methodologies discussed herein, such as those discussed in conjunction with FIG. 4, as well as other methodologies discussed herein. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment. Moreover, the computer processing system 600 may serve in example embodiments as, for example, the user interface system 102 of FIGS. 1 and 2, as well as any component or module described therewith.

In addition to being sold or licensed via traditional channels, embodiments may also be deployed, for example, by software-as-a-service (SaaS) providers, application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 600 includes a processor 602 (e.g., a central processing unit (CPU), a graphics processing unit (GPU), or both), a main memory 604, and a static memory 606, which communicate with each other via a bus 608. The computer processing system 600 may further include a video display 610 (e.g., a plasma display, a liquid crystal display (LCD), or a cathode ray tube (CRT)). The computer processing system 600 also includes an alphanumeric input device 612 (e.g., a keyboard), a user interface (UI) cursor control device 614 (e.g., a mouse and/or touch screen), a drive unit 616, a signal generation device 618 (e.g., a speaker), and a network interface device 620.

The drive unit 616 includes a machine-readable medium 622 on which is stored one or more sets of instructions 624 and data structures embodying or utilized by any one or more of the methodologies or functions described herein. The instructions 624 may also reside, completely or at least partially, within the main memory 604, the static memory 606, and/or the processor 602 during execution thereof by the computer processing system 600, with the main memory 604, the static memory 606, and the processor 602 also constituting tangible machine-readable media 622.

The instructions 624 may further be transmitted or received over a network 626 via the network interface device 620 utilizing any one of a number of well-known transfer protocols (e.g., Hypertext Transfer Protocol).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding, or carrying a set of instructions 624 for execution by the computer and that cause the computer to perform any one or more of the methodologies of the present application, or that is capable of storing, encoding, or carrying data structures utilized by or associated with such a set of instructions 624. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. A user interface system comprising:
one or more hardware processors; and
a memory storing instructions that, when executed by at least one of the one or more hardware processors, cause the user interface system to perform operations comprising:
accessing a layout definition for a user interface, the layout definition defining one or more user interface groups, each of the one or more user interface groups comprising one or more user interface elements;
accessing metadata describing the one or more user interface groups and the one or more user interface elements of each of the one or more user interface groups, each of the one or more user interface elements having an element type;
accessing one or more control renderers, each control renderer comprising first programming code configured to render those of the one or more user interface elements of a corresponding element type based on the metadata describing those of the one or more user interface elements of the corresponding element type;
accessing one or more context renderers, each context renderer comprising second programming code configured to arrange one or more of the rendered user interface elements in a layout for the user interface based on one or more relationships between the one or more user interface groups;
extracting the one or more user interface groups based on the layout definition;
identifying the one or more user interface elements of each of the extracted one or more user interface groups;
identifying the one or more context renderers based on the extracted one or more user interface groups;
identifying the one or more control renderers based on the identified one or more user interface elements of each of the extracted one or more user interface groups, wherein the identifying of the one or more context renderers comprises determining that a first user interface group of the one or more user interface groups is not explicitly represented in a context renderer, and identifying a default context renderer as one of the one or more context renderers based on the determining that the first user interface group of the one or more user interface groups is not explicitly represented in a context renderer; and
executing the one or more control renderers and the one or more context renderers to render the user interface.

2. A method for generating a user interface, the method comprising:
accessing, at a data store by a computer system, a layout definition for a user interface, the layout definition defining one or more user interface groups, each of the one or more user interface groups comprising one or more user interface elements;
accessing, at the data store by the computer system, metadata describing the one or more user interface groups and the one or more user interface elements of each of the one or more user interface groups, each of the one or more user interface elements having an element type;
accessing, at the data store by the computer system, one or more control renderers, each control renderer comprising first programming code configured to render those of the one or more user interface elements of a corresponding element type based on the metadata describing those of the one or more user interface elements of the corresponding element type;
accessing, at the data store by the computer system, one or more context renderers, each context renderer comprising second programming code configured to arrange one or more of the rendered user interface elements in a layout for the user interface based on one or more relationships between the one or more user interface groups; extracting the one or more user interface groups based on the layout definition;
identifying, at the data store by the computer system, the one or more user interface elements of each of the extracted one or more user interface groups;
identifying, at the data store by the computer system, the one or more context renderers based on the extracted one or more user interface groups;
identifying, at the data store by the computer system, the one or more control renderers based on the identified one or more user interface elements of each of the extracted one or more user interface groups, wherein the identifying of the one or more context renderers comprises determining that a first user interface group of the one or more user interface groups is not explicitly represented in a context renderer, and identifying a default context renderer as one of the one or more context renderers based on the determining that the first user interface group of the one or more user interface groups is not explicitly represented in a context renderer;
executing, by the computer system, the one or more control renderers and the one or more context renderers to render the user interface.

3. The method of claim 2, wherein:
the layout definition comprises a reference string for each of the one or more user interface elements of each of the user interface groups; and
a listing order of the reference strings for the one or more user interface elements of a corresponding user interface group determines a display order of the one or more user interface elements in the user interface for the corresponding user interface group.

4. The method of claim 2, wherein: a listing order of the one or more user interface groups determines a display order of the one or more user interface groups in the user interface.

5. The method of claim 2, wherein the metadata for a first user interface element comprises a type of data to be presented in the first user interface element.

6. The method of claim 2, wherein the metadata for a first user interface element comprises text to be displayed for the first user interface element.

7. The method of claim 2, wherein the metadata for a first user interface group comprises a visual format in which the one or more user interface elements of the first user interface group are to be displayed.

8. The method of claim 2, wherein the metadata for a first user interface group comprises an indication of a number of user interface elements of the first user interface group that are to be displayed.

9. The method of claim 2, wherein the one or more relationships between the one or more user interface groups comprises a first user interface group being nested within a second user interface group.

10. The method of claim 2, wherein the one or more relationships between the one or more user interface groups comprises a first user interface group being parallel to a second user interface group.

11. The method of claim 2, wherein:
the layout definition comprises an identity of a first user interface group of the one or more user interface groups and a placeholder identifier representing one or more user interface elements of the first user interface group; and
the identifying of the one or more user interface elements comprises identifying the one or more user interface elements of the first user interface group based on the placeholder identifier.

12. The method of claim 2, wherein the identifying of the one or more control renderers comprises:
determining that a first element type corresponding to at least one of the one or more user interface elements is not explicitly represented in a control renderer; and
identifying a default control renderer as one of the one or more control renderers based on the determining that the first element type corresponding to at least one of the one or more user interface elements is not explicitly represented in a control renderer.

13. The method of claim 2, wherein at least a portion of the metadata comprises at least a portion of a database schema.

14. The method of claim 2, wherein:
the accessing of the layout definition, the metadata, the one or more control renderers, and the one or more context renderers is performed by a plug-in module for a web server; and
the executing of the one or more control renderers and the one or more context renderers is initiated by the plug-in.

15. The method of claim 2, wherein the layout definition is represented in a human-readable data interchange format.

16. The method of claim 2, wherein the user interface comprises a webpage.

17. A non-transitory computer-readable storage medium storing instructions that, when executed by one or more processors of a machine, cause the machine to perform operations comprising:
accessing a layout definition for a user interface, the layout definition defining one or more user interface groups, each of the one or more user interface groups comprising one or more user interface elements;
accessing metadata describing the one or more user interface groups and the one or more user interface elements of each of the one or more user interface groups, each of the one or more user interface elements having an element type;
accessing one or more control renderers, each control renderer comprising first programming code configured to render those of the one or more user interface elements of a corresponding element type based on the metadata describing those of the one or more user interface elements of the corresponding element type;
accessing one or more context renderers, each context renderer comprising second programming code configured to arrange one or more of the rendered user interface elements in a layout for the user interface based on one or more relationships between the one or more user interface groups;
extracting the one or more user interface groups based on the layout definition;
identifying the one or more user interface elements of each of the extracted one or more user interface groups;
identifying the one or more context renderers based on the extracted one or more user interface groups;
identifying the one or more control renderers based on the identified one or more user interface elements of each of the extracted one or more user interface groups, wherein the identifying of the one or more context renderers comprises determining that a first user interface group of the one or more user interface groups is not explicitly represented in a context renderer, and identifying a default context renderer as one of the one or more context renderers based on the determining that the first user interface group of the one or more user interface groups is not explicitly represented in a context renderer; and
executing the one or more control renderers and the one or more context renderers to render the user interface.

18. The non-transitory computer-readable storage medium of claim 17, wherein: a listing order of the one or more user interface groups determines a display order of the one or more user interface groups in the user interface.

19. The non-transitory computer-readable storage medium of claim 17, wherein the metadata for a first user interface element comprises a type of data to be presented in the first user interface element.

20. The non-transitory computer-readable storage medium of claim 17, wherein the metadata for a first user interface element comprises text to be displayed for the first user interface element.

* * * * *